June 23, 1953 W. J. LEWIS ET AL 2,642,672
HOLE GAUGE
Filed Oct. 9, 1950
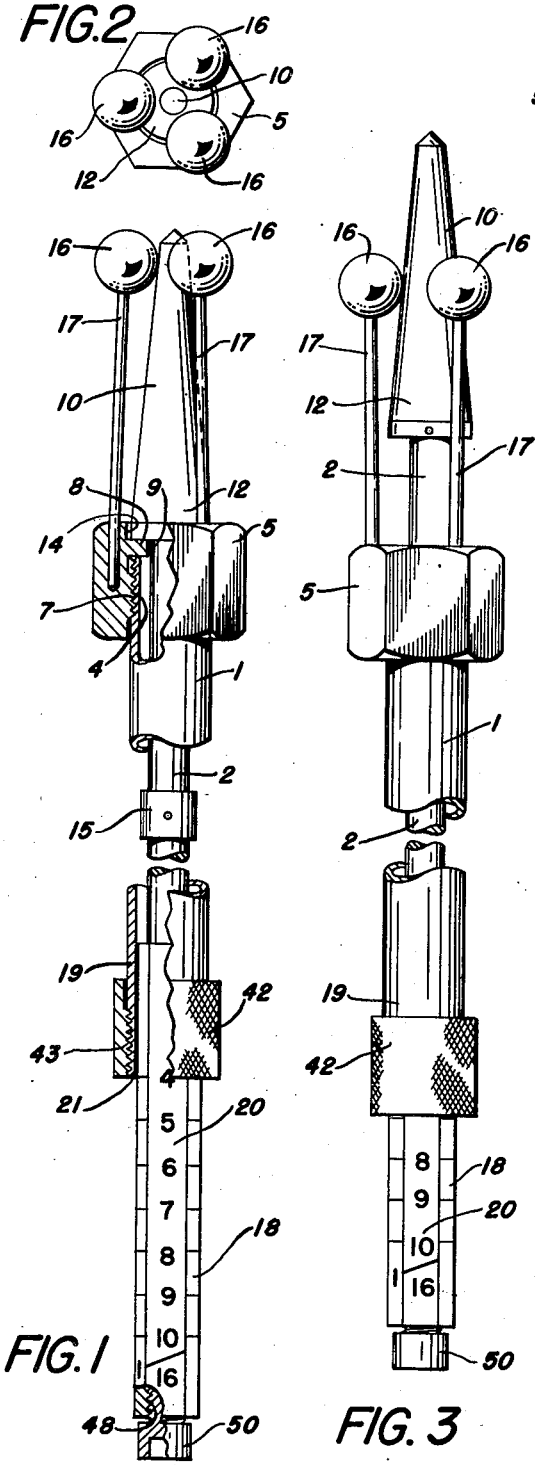
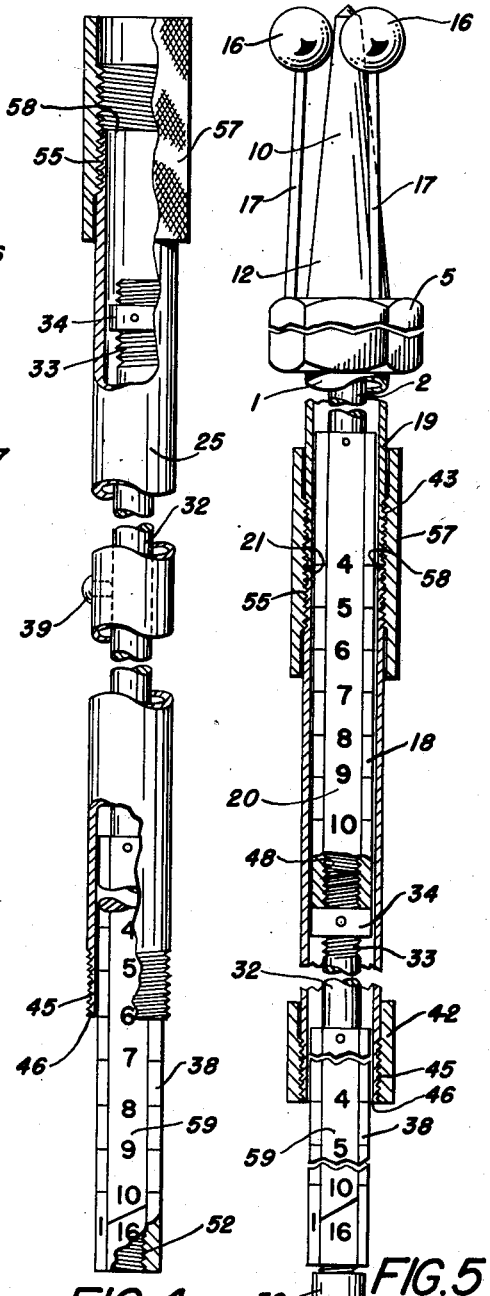
INVENTORS
WARREN J. LEWIS
& WADE H. UTZ
BY Gordon C. Mack
ATTORNEY Patented June 23, 1953

2,642,672

UNITED STATES PATENT OFFICE 2,642,672

HOLE GAUGE

Warren J. Lewis and Wade H. Utz, Mansfield, Ohio, assignors to The Ohio Brass Company, Mansfield, Ohio, a corporation of New Jersey Application October 9, 1950, Serial No. 189,144

5 Claims. (Cl. 33—178)

This invention relates to an improved gauge for measuring the diameter of a hole. This gauge is advantageously employed, for example, to determine whether a hole drilled into the roof of a mine, e. g. in a passageway or the like, is of a size within the required tolerance to permit the proper installation of an expansion bolt with a head, etc. of the type used to support the roof of the mine. The invention includes novel extensions which may be fastened to the gauge when the hole to be measured is deeper than the length of the gauge.

The expansion bolts used for roof supports in a mine are most effective when they are installed in a hole of a particular diameter. In drilling the holes for them it is very difficult to maintain any degree of accuracy since, among other things, there is usually a variation in the earth stratum from place to place in the mine. The holes are often quite deep. They range usually from about two feet to about six or seven feet in depth. With the gauge of this invention each hole may be easily checked after it is drilled and wide variations from the desired diameter may be compensated for before further holes are drilled.

The preferred gauge includes a relatively long rod which is surrounded by tubular casing. One end of the rod is fastened to a plug outside the end of the casing. The rod is movable longitudinally through the casing to move the plug toward and away from the end of the casing.

The sides of the plug are tapered, and hard metal balls are spaced around the plug in contact with the plug's tapered surface. Each of these balls is mounted on a springy wire which is fastened to the casing. The balls are all of equal diameter and are arranged around the plug in a plane perpendicular to the axis of the plug. The surface of the plug tapers at the same degree adjacent each ball so that each of the balls is adapted to be moved an equal amount in a direction radial to the axis of the plug when the plug is moved toward and away from the end of the casing.

The lower end of the rod is provided with a scale graduated in units which measures the diameter of a hole. When the gauge is inserted into the hole the plug is adjacent the end of the casing, the entire scale is outside of the lower end of the casing, and the zero point of the scale registers exactly with the lower end of the casing. The diameter of the hole is measured by moving the rod upward until the balls are pressed against the sides of the hole by the plug. This moves a part of the scale into the casing, and the scale is calibrated so that the lower end of the casing now shows the diameter of the hole.

The extensions used with the gauge in order to measure deeper holes are formed with a casing and a rod removable through the casing. At one end of the rod there is a scale identical with the gauge scale. The other end of the rod is connected to the gauge rod and the casings of the extension and gauge are connected when the two are assembled. The extensions are also adapted to be connected to other extensions so that any number of extensions may be used. Zero on the scale of the outer extension registers with the edge of the casing when the plug is adjacent the upper end of the gauge casing, and the scale extends outward from the end of the casing and is moved into it as a hole is measured so that the depth of the hole may be read directly regardless of the number of extensions used.

The invention will be further described in connection with the accompanying drawings in which—

Fig. 1 is a lengthwise view of a preferred gauge with the plug adjacent the end of the casing, with certain portions of the gauge broken away to show the interior structure;

Fig. 2 is a top view of the gauge;

Fig. 3 is a lengthwise view of the gauge with the plug away from the end of the casing, but not extended the full distance;

Fig. 4 is a lengthwise view of a preferred extension with portions broken away; and Fig. 5 is a view of the gauge and extension assembled together, certain portions being broken away.

The gauge shown in Fig. 1 is formed with a tubular casing 1 which will usually be about thirty inches long. A rod 2 extends longitudinally through the gauge casing and is slidable back and forth in it. The end 4 of the casing is enclosed by cap 5 which is threaded tightly onto the threads 7 around the end of the casing with the shoulder 8 of the cap fitting tightly against the end of the casing. The upper end of rod 2 fits slidably through a hole 9 in the top of the cap and a plug 10 is fastened to this end of the rod.

The plug 10 is preferably conical as shown and is positioned with its axis extending axially of the rod. The wider base portion 12 of the plug is toward the cap and the upper surface of the cap is recessed at 14 and the base of the plug may be seated in the recess 14.

The rod may be extended out of the end of the casing through the cap 5 to push the plug away from the cap until a collar 15 around the rod inside the casing contacts the shoulder 8 in the cap. This collar 15 limits the extent to which the rod may be projected beyond the end of the casing.

Each of the balls 16 is mounted on a wire 17 which projects upwardly from the cap. These wires are preferably of steel and quite springy so that each holds its ball against the plug's tapered surface regardless of the position of the plug. The balls are advantageously made of steel. The surface of each of the balls is smooth so that it makes a point contact with the smooth, tapered surface of the plug. The wires 17 are preferably straight. They are of equal length so that they support the balls in a plane perpendicular to the axis of the plug. Preferably three balls 16 are used and these are spaced 120° apart around the plug so that the gauge is self-centering when it is inserted in a hole. Two or more balls 16 may be used however, preferably at equally spaced intervals around the plug.

A scale bar 18 is fastened to the lower end of the rod and this bar projects out of the lower end 19 of the gauge casing. By pushing upwardly on bar 18 the rod is slid through the casing to force the plug away from cap 5. As the plug moves upwardly its tapered surface 12 forces the balls radially outward in the manner shown in Fig. 3 until the balls 16 are pressed against the sides of the hole.

The bar 18 is preferably formed of a soft metal such as brass and is about the same diameter as the inner diameter of the gauge casing so that it just slides through the casing. One side of the bar is flattened slightly and the graduations 20 are stamped into this flattened side. The graduations are located so that the diameter of the hole being measured is indicated by the bottom edge 21 of the gauge casing. After the rod has been adjusted as explained above, the diameter of the hole is read from the graduations on the flattened side.

The graduations on the scale indicate the diameter of a circle which could be circumscribed around the balls when the balls are touching the plug at any point between its base and apex. The length of the scale is equal to the length of the conical plug. Preferably a relatively long plug will be used so that relatively slight movements of the balls may be read on the scale. The spacing of the graduations of the scale is determined by the angle of the taper on the surface of the plug. A conical plug is preferred although a plug having a tapered surface curved toward or away from the axis of the plug may be used and in this event the graduations will be spaced accordingly. If the rod is prevented from twisting within the casing, the plug may be a pyramid instead of a cone.

The scale shown in the drawings is graduated in sixteenths of an inch and the gauge is designed to measure holes from 1¼ to 1⅝ inches in diameter. The zero reading on the scale is therefore "4" meaning one and four sixteenths inches. This reading is obtained when the plug is in the position shown in Fig. 1, with the balls touching the plug around its apex. The maximum diameter is measured when the plug 10 is extended the farthest distance possible from the cap 5 and the balls are touching the plug just above its base. The collar 15 on the rod 2 prevents the plug from being extended beyond this point.

The casing 1 of the preferred gauge is about thirty inches long. For measuring the diameter of a hole deeper than this, extensions such as shown in Fig. 4 may be connected to the bottom of the gauge. The extensions are formed with a casing 25 which is the same diameter as the gauge casing 1. A rod 32 extends slidably through this casing. Its upper end 33 is threaded and is provided with a collar 34. The lower end of the rod 32 is provided with a brass bar 38 which is identical to the bar 18 of the gauge and is also graduated in exactly the same manner. A small rivet 39 is provided which extends into the inside of the casing at a point between the collar 34 and the upper end of the bar 38 to prevent the rod 32 from sliding completely out of either end of the casing.

To connect the extension shown in Fig. 4 to the gauge shown in Fig. 1 it is first necessary to remove the knurled cap 42 which is threaded onto the threads 43 around the end 19 of the gauge casing and then this cap is screwed onto the threads 45 at the end 46 of the extension casing 25. This cap serves no function other than to protect the threads 43 and the threads 45. It must be screwed up tight in either position because it determines the zero point on the scales.

In the bottom of the scale bar 18 there is a tapped hole 48 as shown in Fig. 1, and when the gauge is used without an extension a cap screw 50 is threaded into this hole to protect its threads. In the bottom of the bar 38 of the extension there is a tapped hole 52, the same size as hole 48, so that the cap screw 50 may be removed from hole 48 and inserted into the hole 52 in the bottom of bar 38. The thread 33 on the upper end of the extension rod 32 is then screwed into the hole 48 in bar 18 and tightened until the collar 34 fits against the bottom of the plug. (See Fig. 5.)

The upper end of the extension casing is threaded at 55 and the lower half of a knurled sleeve 57 is screwed onto thread 55. After the extension rod 32 is connected to the bottom of bar 18 the upper half of sleeve 57 is screwed onto the threads 43 around end 19 of the gauge casing so that the two casings are coupled together as shown in Fig. 5. It is necessary that the casings be properly connected with the bottom edge 21 of the gauge casing fitting flat against the top edge 58 of the extension casing so that the bottom 46 of the cap 42 will give the correct scale readings.

With the extension the gauge is operated in exactly the same manner as previously described except that the size of the hole being measured is indicated by the bottom edge 46 of the extension casing on the graduations 59 formed on the bar 38.

As many extensions as desired may be employed. Each extension will be identical to the one shown in Fig. 4 and each may be fastened to the bottom end of another extension by the same manipulations that were described above in connection with fastening an extension to the bottom end of the gauge. Preferably each end of an extension will be covered by a rubber cap (not shown) when not in use to protect the ends of the extension.

The elements of each gauge and each extension are assembled in special fixtures so that an accurate reading may be obtained on the scales regardless of minor variations in the length of the casing or rods. The extensions may be used interchangeably with any gauge of this type. The extensions are identical to one another and give exactly the same reading that the gauge would give if the extensions were not used.

The invention is defined in the following claims:

What we claim is:

1. A gauge for measuring the diameter of a hole, which gauge comprises a tubular casing, a rod extending through the casing and movable longitudinally thereof, extending from one end of the casing and spaced equally from each other a plurality of springy wires of equal length, a ball fastened at the outer end of each of the wires, all balls being of the same diameter, a conically shaped plug with its base fastened to the end of the rod adjacent said end of the casing, the balls being held against the tapered surface of the plug by their respective wires, whereby movement of the rod moves the balls radially relative to the axis of the plug, and calibrations on the other end of the rod for a distance equal to the length of the plug, and means at that end of the casing to indicate on the calibrations the distance of the plug from its end of the casing and hence the diameter of a circle which may be circumscribed around the balls against the tapered surface of the plug at that distance from the end of the casing.

2. A gauge for measuring the diameter of a hole, which gauge includes a gauge casing, a rod extending through the casing and movable longitudinally thereof, outside one end of the casing a tapered plug with its base fastened to the rod and movable toward and away from the casing by the rod, surrounding the tapered plug a plurality of hole-contacting elements on laterally resilient means projecting from the end of the casing by means of which said hole-contacting elements are supported in contact with the tapered surface of the plug, abutting the opposite end of the gauge casing in axial alignment therewith an extension casing, movable through the extension casing a rod which is fastened to the end of the first rod, the rods being movable longitudinally as a unit through the casings to change the relative position of the hole-contacting elements with respect to the plug and calibrations on the second rod adapted to register with indicating means on the extension casing to indicate the distance the plug is from its end of the gauge casing and hence the diameter of a circle circumscribed around the hole-contacting elements in contact with the tapered surface of the plug at said distance from the end of the gauge casing.

3. A gauge for measuring the diameter of a hole, which gauge comprises a tubular casing, a rod extending through the casing and movable longitudinally thereof, a conically shaped plug with its base fastened to the end of the rod adjacent one end of the casing, a plurality of resilient supports of equal length extending from said end of the casing and spaced equally from each other, a knob at the outer end of each of the supports, each knob having one convex surface in contact with the tapered surface of the plug and opposite this another convex surface adapted to contact the inner surface of the hole, the points adapted to contact the hole all lying in a circle, the knobs being held against the tapered surface of the plug by their respective supports, whereby movement of the rod moves the knobs radially relative to the axis of the plug, and calibrations on the other end of the rod for a distance equal to the length of the plug, and means at that end of the casing to indicate on the calibrations the distance of the plug from its end of the casing and hence the diameter of a circle which may be circumscribed around the knobs against the tapered surface of the plug at that distance from the end of the casing.

4. A gauge for measuring the diameter of a hole, which gauge comprises a tubular casing, a rod extending through the casing and movable longitudinally thereof, a conically shaped plug with its base fastened to end of the rod adjacent one end of the casing, three resilient supports of substantially equal length extending from said end of the casing and spaced equally from each other, a knob at the outer end of each of the supports, each knob having one convex surface in contact with the tapered surface of the plug and opposite this another convex surface adapted to contact the inner surface of the hole, the knobs being held against the tapered surface of the plug by their respective supports, whereby movement of the rod moves the knobs radially relative to the axis of the plug, and calibrations on the other end of the rod for a distance equal to the length of the plug, and means at that end of the casing to indicate on the calibrations the distance of the plug from its end of the casing and hence the diameter of a circle which may be circumscribed around the knobs against the tapered surface of the plug at that distance from the end of the casing.

5. A gauge for measuring the diameter of a hole, which gauge includes a gauge casing, a rod extending through the casing and movable longitudinally thereof, outside one end of the casing a tapered plug with its base fastened to the rod and movable toward and away from the casing by the rod, surrounding the tapered plug a plurality of hole-contacting elements on laterally resilient means projecting from the end of the casing by means of which said hole-contacting elements are supported in contact with the tapered surface of the plug, the end of the rod opposite said end of the casing being calibrated and means at that end of the casing to indicate on the calibrations the distance of the plug from its end of the casing and hence the diameter of a circle which may be circumscribed around the hole-contacting elements against the tapered surface of the plug at that distance from the end of the casing, an extension casing abutting the opposite end of the gauge from that from which the plug extends, said extension casing being in alignment with the gauge casing, movable through the extension casing a rod which is fastened to the calibrated end of the first rod, the rods being movable longitudinally as a unit through the casings to change the relative position of the hole-contacting elements with respect to the plug, and calibrations on the second rod adapted to register with indicating means on the extension casing to indicate the distance the plug is from its end of the gauge casing and hence the diameter of a circle circumscribed around the hole-contacting elements in contact with the tapered surface of the plug at said distance from the end of the gauge casing.

WARREN J. LEWIS.
WADE H. UTZ.

References Cited in the file of this patent

UNITED STATES PATENTS

| Number | Name | Date |
|---|---|---|
| 1,008,842 | Maier | Nov. 14, 1911 |
| 1,408,808 | Keopple | Mar. 7, 1922 |
| 1,904,143 | Koos | Apr. 18, 1933 |
| 2,312,222 | Tanner | Feb. 23, 1943 |
| 2,496,655 | Balk | Feb. 7, 1950 |
| 2,499,251 | Marascio | Feb. 28, 1950 |
| 2,523,469 | Hubeck | Sept. 26, 1950 |

FOREIGN PATENTS

| Number | Country | Date |
|---|---|---|
| 28,854 | Great Britain | Dec. 16, 1896 |
| 569,225 | Great Britain | May 14, 1945 |
| 597,901 | Great Britain | Feb. 5, 1948 |